US012737303B2

(12) United States Patent
Akula et al.

(10) Patent No.: US 12,737,303 B2
(45) Date of Patent: Sep. 15, 2026

(54) VIRTUAL STORAGE MECHANISM TO OPTIMIZE FETCH PERFORMANCE OF NAMED OBJECTS IN ENTERPRISE SYSTEMS

(71) Applicant: Kyndryl, Inc., New York, NY (US)

(72) Inventors: Ravinder Akula, Bengaluru (IN); Srikanth Rao Adige, Bangalore (IN); Jeevabharathy Murugesan, Bangalore (IN); Neelakanta Kella, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 40 days.

(21) Appl. No.: 18/502,433

(22) Filed: Nov. 6, 2023

(65) Prior Publication Data

US 2025/0147899 A1 May 8, 2025

(51) Int. Cl.
*G06F 12/123* (2016.01)
*G06N 3/09* (2023.01)

(52) U.S. Cl.
CPC ............. *G06F 12/123* (2013.01); *G06N 3/09* (2023.01)

(58) Field of Classification Search
CPC ................................ G06F 12/123; G06N 3/09
See application file for complete search history.

(56) References Cited

U.S. PATENT DOCUMENTS

| | | | | |
|---|---|---|---|---|
| 7,330,942 | B2 | 2/2008 | De et al. | |
| 11,327,676 | B1 | 5/2022 | Fernandez et al. | |
| 11,354,056 | B2 * | 6/2022 | Mittal | G06F 13/1694 |
| 12,182,035 | B2 * | 12/2024 | Koker | G06F 12/0891 |
| 2018/0081561 | A1 | 3/2018 | Todd et al. | |
| 2020/0012962 | A1 * | 1/2020 | Dent | G06N 3/09 |
| 2021/0097557 | A1 | 4/2021 | Liu | |
| 2021/0373761 | A1 | 12/2021 | Karr et al. | |
| 2022/0222082 | A1 * | 7/2022 | Gopalakrishnan | G06F 9/445 |
| 2023/0289291 | A1 * | 9/2023 | Lee | G06N 3/063 |
| 2024/0086328 | A1 * | 3/2024 | Vazhkudai | G06F 12/0862 |
| 2024/0193088 | A1 * | 6/2024 | Sun | G06F 12/0862 |

FOREIGN PATENT DOCUMENTS

| | | |
|---|---|---|
| CA | 1312675 C | 1/1993 |

* cited by examiner

*Primary Examiner* — Eric T Loonan
(74) *Attorney, Agent, or Firm* — CANTOR COLBURN LLP; Erik Swanson

(57) ABSTRACT

Embodiments relate to enhancing a virtual storage mechanism to optimize fetch performance of named objects in enterprise systems. A technique includes receiving from a requester a request to retrieve an object and determining that the object is available for retrieval in a virtual data space, where a machine learning model is configured to cause the object to be placed in the virtual data space, the machine learning model being trained on fetch data for objects. The technique includes retrieving the object from the virtual data space instead of a storage system and providing the object to the requester for execution.

20 Claims, 8 Drawing Sheets

100
Mass Storage 110
Hard Disk 108
Software 111
I/O Adapter 106
Network 112
Communications Adapter 107
System Bus 102
Display Adapter 115
Display 119
System Memory 103
RAM 105
ROM 104
Interface Adapter 116
Microphone 124
Speaker 123
Mouse 122
Keyboard 121
101
CPU 101a
CPU 101b
CPU 101c SYSTEM 200
COMPUTER SYSTEM 202
SOFTWARE 204 (VLF FUNCTION)
SOFTWARE APPLICATION 260
MACHINE LEARNING MODEL 210
GRAPHICAL USER INTERFACE 216
PLACEMENT SOFTWARE 214
MONITORING SOFTWARE 220
VIRTUAL LOOKASIDE FACILITY (VLF) 230
LIBRARY LOOKASIDE (LLA) 232
(VIRTUAL) DATA SPACE 280
(TIER 1) FVLF 242
(TIER 2) PVLF 244
(TIER 3) TVLF 246
TRAINING DATA 218
NETWORK 250
STORAGE SYSTEM 240A
STORAGE SYSTEM 240B
STORAGE SYSTEM 240N
1
2
M

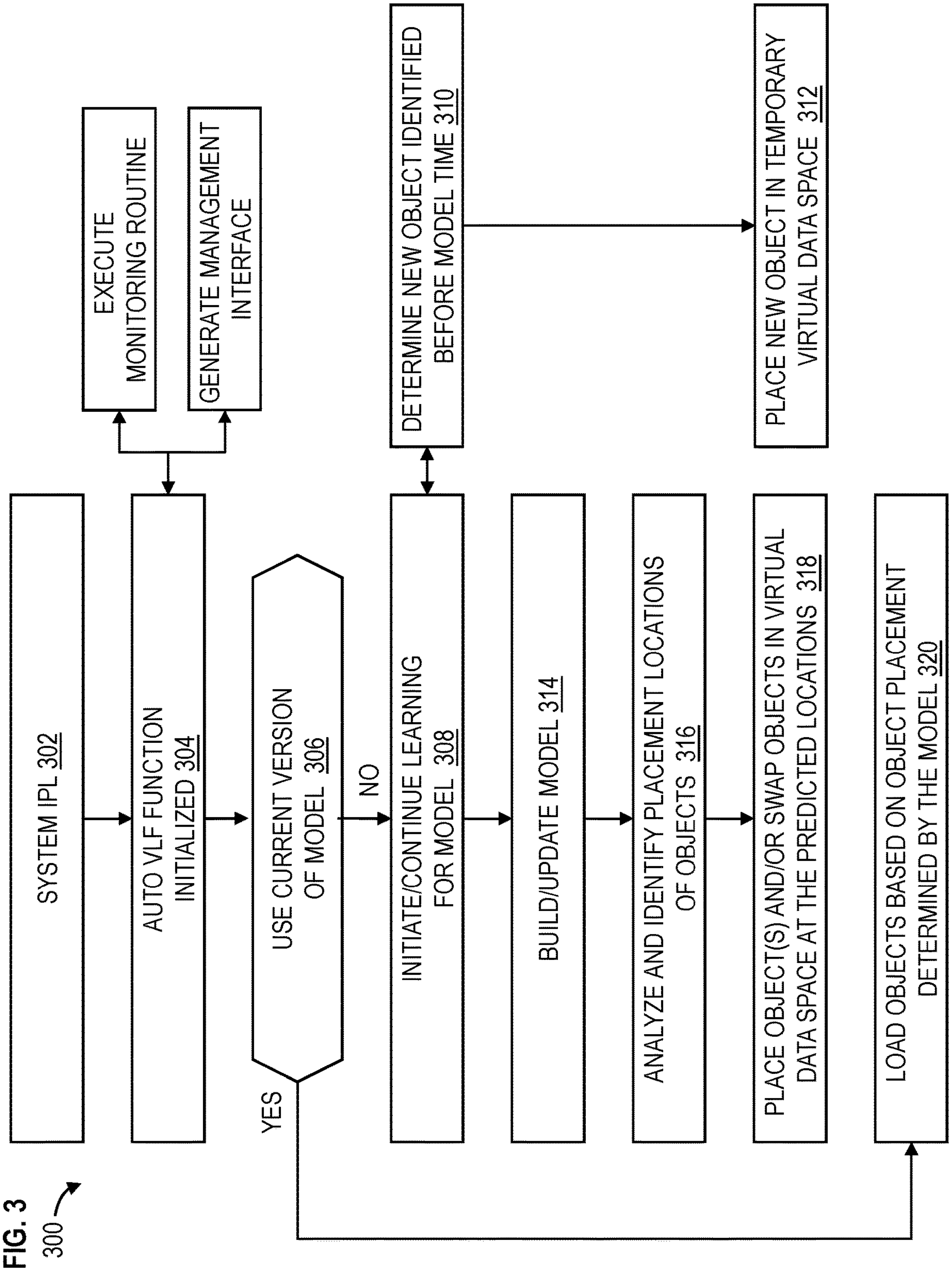

FIG. 3
300
SYSTEM IPL 302
AUTO VLF FUNCTION INITIALIZED 304
EXECUTE MONITORING ROUTINE
GENERATE MANAGEMENT INTERFACE
YES
USE CURRENT VERSION OF MODEL 306
NO
INITIATE/CONTINUE LEARNING FOR MODEL 308
DETERMINE NEW OBJECT IDENTIFIED BEFORE MODEL TIME 310
BUILD/UPDATE MODEL 314
ANALYZE AND IDENTIFY PLACEMENT LOCATIONS OF OBJECTS 316
PLACE OBJECT(S) AND/OR SWAP OBJECTS IN VIRTUAL DATA SPACE AT THE PREDICTED LOCATIONS 318
PLACE NEW OBJECT IN TEMPORARY VIRTUAL DATA SPACE 312
LOAD OBJECTS BASED ON OBJECT PLACEMENT DETERMINED BY THE MODEL 320

400

RECEIVE A REQUEST FOR AN OBJECT 402

IS THE REQUESTER A VLF USER 404

NO

OBTAIN FROM STORAGE SYSTEM 406

YES

CHECK THE TIERED LEVELS OF THE VIRTUAL DATA SPACE FOR THE REQUESTED OBJECT 408

IS REQUESTED OBJECT FOUND IN ANY TIER OF THE VIRTUAL DATA SPACE 410

NO

YES

RETRIEVE THE OBJECT FROM THE VIRTUAL DATA SPACE 412

INITIATE/CONTINUE LEARNING FOR MODEL 414

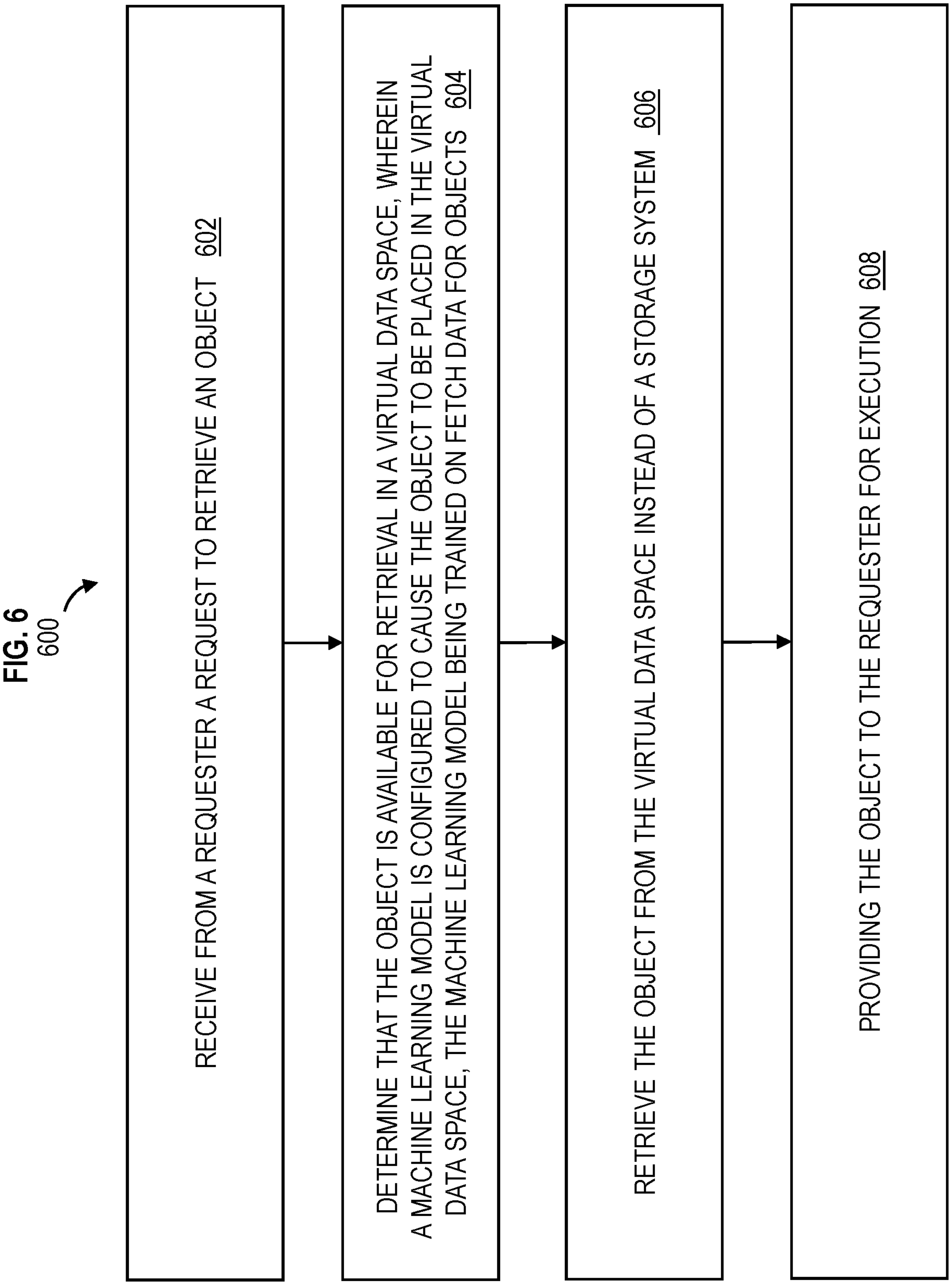

FIG. 6
600
RECEIVE FROM A REQUESTER A REQUEST TO RETRIEVE AN OBJECT 602
DETERMINE THAT THE OBJECT IS AVAILABLE FOR RETRIEVAL IN A VIRTUAL DATA SPACE, WHEREIN A MACHINE LEARNING MODEL IS CONFIGURED TO CAUSE THE OBJECT TO BE PLACED IN THE VIRTUAL DATA SPACE, THE MACHINE LEARNING MODEL BEING TRAINED ON FETCH DATA FOR OBJECTS 604
RETRIEVE THE OBJECT FROM THE VIRTUAL DATA SPACE INSTEAD OF A STORAGE SYSTEM 606
PROVIDING THE OBJECT TO THE REQUESTER FOR EXECUTION 608

VIRTUAL STORAGE MECHANISM TO OPTIMIZE FETCH PERFORMANCE OF NAMED OBJECTS IN ENTERPRISE SYSTEMS

BACKGROUND

The present invention generally relates to computer systems, and more specifically, to computer-implemented methods, computer systems, and computer program products configured and arranged to enhance a virtual storage mechanism to optimize fetch performance of named objects in enterprise systems.

There are a number of software services that process objects residing on direct access storage devices (DASDs). The overhead to load an object from DASD and manipulate the element into a usable format for every user request can be costly in terms of central processing unit (CPU) time and input/output (I/O) processing. Direct access storage devices (DASDs) can be fixed or removable storage devices. Typically, these storage devices can include rotating disk drives, solid state disks, etc. Input and output (I/O) requests are made to retrieve and store data in the DASDs.

Some mainframes may use virtual storage. Virtual storage means that each running program can assume it has access to all of the storage defined by the architecture's addressing scheme. This ability to use a large number of storage locations is useful because a program may be long and complex, and both the program's code and the data it requires should be in central/real storage for the processor to access them.

Although methods and systems of fetching objects in enterprises are suitable for their intended purposes, one or more embodiments provide improvements to fetch performance of named objects in enterprise systems.

SUMMARY

Embodiments of the present invention are directed to computer-implemented methods for enhancing a virtual storage mechanism to optimize fetch performance of named objects in enterprise systems. A non-limiting computer-implemented method includes receiving from a requester a request to retrieve an object. The method includes determining that the object is available for retrieval in a virtual data space, where a machine learning model is configured to cause the object to be placed in the virtual data space, the machine learning model being trained on fetch data for objects. Also, the method includes retrieving the object from the virtual data space instead of a storage system and providing the object to the requester for execution.

This can provide an improvement over known methods for fetching named objects by eliminating input/output requests involved in retrieving named objects as a copy of the object is always available in the virtual data space. This reduces the amount of central processing unit (CPU) time required to execute the batch and online workloads, thereby reducing the million service units (MSU) usage. This also reduces the number of input/output processing of requests to the storage system (e.g., DASD). Improvements also provide highly efficient automated object management using machine learning for all types of workloads of the objects.

In addition to one or more of the features described above or below, or as an alternative, further embodiments of the invention disclose where the virtual data space includes tiers. This advantageously allows objects in higher priority tiers to have faster retrieval times than objects in lower priority tiers.

In addition to one or more of the features described above or below, or as an alternative, further embodiments of the invention disclose where the object is retrieved from a tier in the virtual data space. This advantageously allows objects in higher priority tiers to have faster retrieval times than objects in lower priority tiers.

In addition to one or more of the features described above or below, or as an alternative, further embodiments of the invention disclose where the machine learning model is retrained based on a trigger, the machine learning model being retrained using the fetch data that has been updated based on recent fetches for the objects. This advantageously allows machine learning model to be updated or retrained based on the most recent fetch data of statistics for objects being fetched via I/O requests from the auxiliary storage system (e.g., DASD) and for objects being fetched from the virtual data space, such that one or more objects can be added or removed from the virtual data space and one or more objects can be swapped to different tiers within the virtual data space.

In addition to one or more of the features described above or below, or as an alternative, further embodiments of the invention disclose where the trigger includes at least one of a setting in a graphical user interface, a predefined time period, a predefined change in the fetch data, and/or a new object being added to the storage system. This advantageously allows machine learning model to be updated or retrained based on the most recent fetch data of statistics for objects being fetched via I/O requests from the auxiliary storage system (e.g., DASD) and for objects being fetched from the virtual data space, such that one or more objects can be added or removed from the virtual data space and one or more objects can be swapped to different tiers within the virtual data space. Also, this advantageously allows a graphical user interface to view, monitor, and control aspects of fetch performance tuning.

In addition to one or more of the features described above or below, or as an alternative, further embodiments of the invention disclose where a library lookaside is automatically updated based on any object being added to the virtual data space, changed from one tier to another tier in the virtual data space, and removed from the virtual data space. This advantageously allows the listing of named object in the library lookaside to be automatically updated according to the objects stored in the virtual data space according to any object being added, changed from one tier to tier, and removed from the virtual data space.

In addition to one or more of the features described above or below, or as an alternative, further embodiments of the invention disclose where the storage system includes auxiliary storage that requires input and output requests to access data. This advantageously allows a reduction in the amount of input/output requests involved in retrieving named objects from the storage system.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a flowchart of a computer-implemented method for providing an automatic virtual storage mechanism to optimize fetch performance of named objects in enterprise systems according to one or more embodiments of the present invention;

FIG. 6 is a flowchart of a computer-implemented method for providing an automatic virtual storage mechanism to optimize fetch performance of named objects in enterprise systems according to one or more embodiments of the present invention;

DETAILED DESCRIPTION

Figure 1:
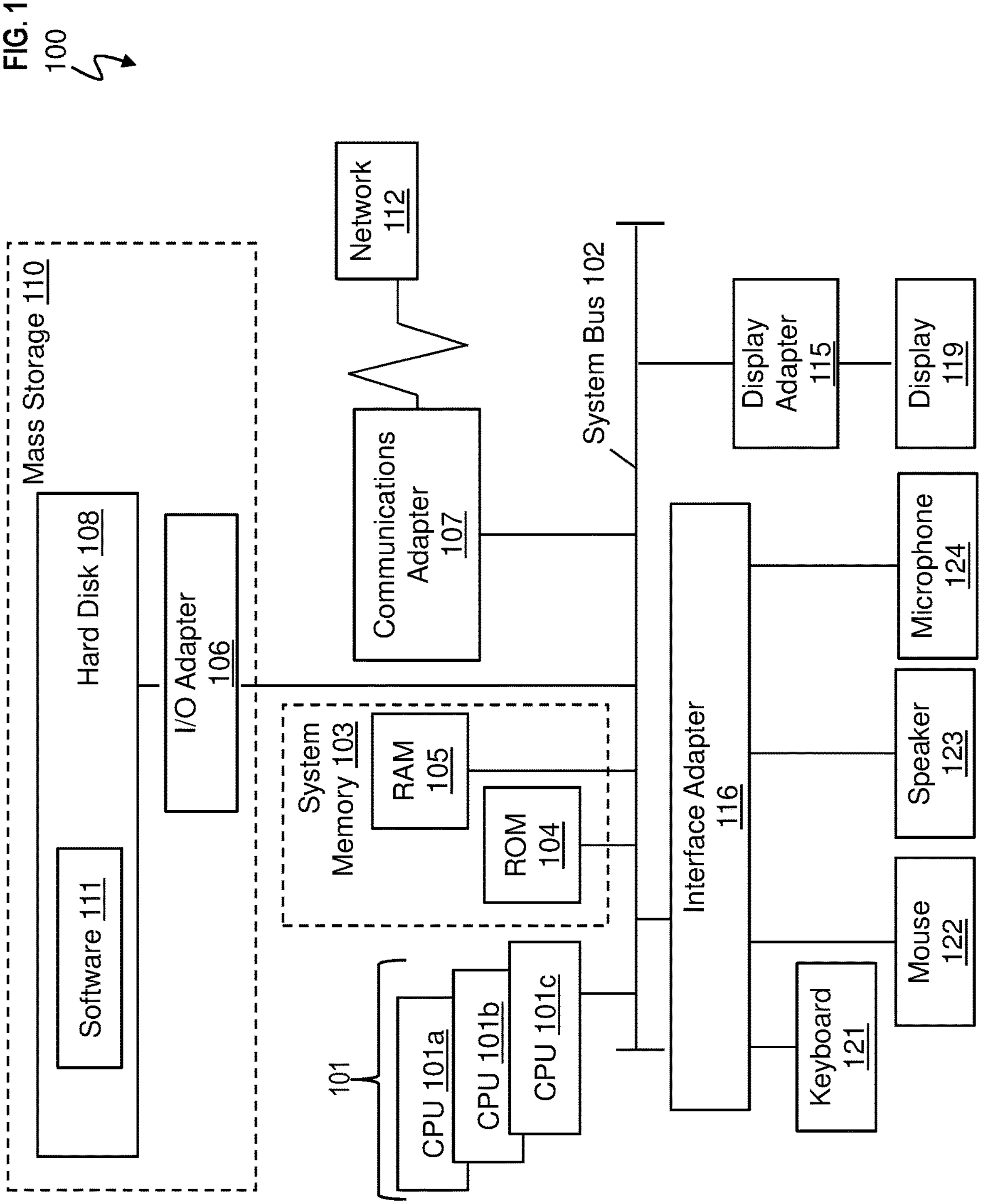
FIG. 1 depicts a block diagram of an example computer system for use in conjunction with one or more embodiments of the present invention.

One or more embodiments provide computer-implemented methods, computer systems, and computer program products for enhancing a virtual storage mechanism to optimize fetch performance of named objects in enterprise systems. One or more embodiments provide an automated system for storing, maintaining, and retrieving named data objects in virtual storage so as to enhance the module fetch time and increase system performance, thereby improving operational response and performance. One or more embodiments are configured to provide a control structure implemented within the operating system using machine learning and robotic process automation to identify and record statistics such as programs/objects fetched for execution at different times of the day, fetch level (e.g., fetched from memory, DASD, etc.), fetch time, execution time, number of fetches, etc.

In accordance with one or more embodiments, a control structure can use the recorded data to perform analysis and build a machine learning model from the collected statistics to determine optimal virtual memory placement of objects. The control structure can automatically identify workload pattern changes from the recorded statistics and determine swap intervals to swap a set or subset of programs with another set or subset in the virtual memory. Based on the swap intervals, the control structure can use robotic process automation to perform the swaps.

Example definitions and acronyms are provided below.

1) The pageable link pack area (PLPA) allows one to place programs in common virtual storage. The operating system then manages the processor storage residency of these programs in a least recently used (LRU) manner.
2) Preload: some subsystems allow application programs to be preloaded into their private virtual storage. The residency of these programs falls into the LRU working set management.
3) The library lookaside (LLA) facility uses a virtual lookaside facility (VLF) dataspace to hold the most active modules of linklist and user-specified program libraries. When an address space requests an LLA-managed program that is in the dataspace, the load module is retrieved from VLF instead of from the program library on DASD.
4) Virtual lookaside facility (VLF) is a set of services that can improve the performance and response time of applications that must retrieve a set of data for many users. VLF creates and manages a data space to store an application's most frequently used data. When the application makes a request for data, VLF checks its data space to see if the data is there. If the data is present, VLF can rapidly retrieve it without requesting I/O to DASD. To take advantage of VLF, an application identifies the data it needs to perform its task. The data is known as a data object or simply an object. Data objects should be small to moderate in size and named according to the VLF naming convention.

Modules also referred to as programs, whether stored as load modules or program objects, are to be loaded into both virtual storage and central storage before they can be run. Modules can be one type of object. When one module calls another module, either directly by asking for it to be run or indirectly by requesting a system service that uses it, the module does not begin to run instantly. How long it takes before a requested module begins to run depends on where in its search order the system finds a usable copy of the requested module and on how long it takes the system to make the copy it finds available. In the current scenario, techniques such as LLA and VLF are used to reduce the fetch time of objects. Managing objects using these techniques is a manual task that requires a high degree of technical and environmental knowledge. However, one or more embodiments provide automated techniques to manage the objects as discussed further herein.

In the current scenario, when a program requests a module, the system searches for the requested module in various system areas and libraries. The order of obtaining the requested module is in the following list. a) Modules loaded under the current task (link logical elements (LLEs)). b) The job pack area (JPA). c) Tasklib, Joblib, Steplib, or any libraries that were indicated by a data control block (DCB) specified as an input parameter to the macro used to request the module (LINK, LINKX, LOAD, ATTACH, ATTACHX, XCTL or XCTLX). d) An active link pack area (LPA) that contains a fixed link pack area (FLPA) and modified link pack area (MLPA). e) Pageable link pack area (PLPA). f) SYS1.LINKLIB and libraries concatenated to it through the LNKLSTxx member of the parmlib.

When searching TASKLIBs, STEPLIBs, JOBLIBs, a specified DCB or the LNKLST concatenation for a module, the system searches each dataset directory for the first directory entry that matches the name of the module. The directory is located on DASD with the dataset and is updated whenever the module is changed. The directory entry contains information about the module and where it is located within storage (e.g., DASD). Repetitive searches of DASD and high I/O activity is required to fetch programs queued for execution. In order to eliminate this and reduce the I/O activity, selected directory entries can be placed in storage. This facility is provided by a multiple virtual storage (MVS) component called library lookaside (LLA). The LLA caches in its address space a copy of the directory entries for the libraries it manages. For modules that reside in LLA managed libraries, the system can quickly search the directories in virtual storage, instead of using I/O to search the directories on DASD. This way, the I/O required to search library directories on DASD can be eliminated. However, I/O is still required to fetch the object itself from DASD into real storage. In order to eliminate the fetch for the object, another MVS component called virtual lookaside facility (VLF) is used in conjunction with LLA. The VLF is a set of MVS services that provides a high performance alternate path method of retrieving named objects from DASD on behalf of many users. VLF runs as an address space and uses data spaces to hold data objects in virtual storage.

When used with VLF, LLA reduces the I/O fetch required to fetch modules from DASD by causing selected modules to be staged in VLF data spaces. The LLA improves the performance of fetching modules from both LNKLST and non-LNKLST data sets, and the LLA is a control point in managing updates to these data sets on DASD. For each module that is fetched, LLA dynamically accumulates statistics such as the fetch rate and the fetch durations. Using these and other statistics, LLA periodically triggers LLA module staging analysis to evaluate the cost of fetching each module. Based on projected savings, LLA module staging analysis places copies of the most frequently used modules into the VLF data space. The LLA can then fetch these modules from virtual storage without I/O and with a reduced number of processor instructions.

To reap further benefits, staging methodology has to be tuned. In the current scenario, this is a complex procedure that involves modifying LLA exits CSVLLIX1 and CSVLLIX2. Exit CSVLLIX1 monitors and collects fetch statistics and controls staging analysis. By default, when a threshold of 2000 module fetches from a library is reached or after initial 10 fetches of a module from DASD, the module becomes eligible for staging. Exit CSVLLIX2 is responsible to determine the net value of staging. The process described above is a complex procedure that requires a specialized skill set by the system administrator and deep knowledge of technology as well as the operational environment.

The table below illustrates some of the steps and challenges involved.

| LLA/VLF Management Steps | Challenges |
|---|---|
| Identifying libraries to manage | Manually determined and managed.<br>LLA uses a static pre-fed List.<br>Knowledge-gaps, changes in environment, missing updates are detrimental to system performance. |
| Configuration | Needs manual updates and management.<br>Lack of a user friendly interface to analyze, control and monitor staging process or benefits. |

-continued

| LLA/VLF Management Steps | Challenges |
|---|---|
| Influencing Staging | Complex procedure that requires deep system, programming, and environment knowledge to modify system exits. |
| Controlling using commands | Auto updates not available.<br>Changed objects need to be manually updated.<br>No user friendly interface to manage. |
| Storage Exploitation | Advancements in above the bar storage not exploited. |

As one or more embodiments are configured to address various issues discussed herein, an end-to-end enhancement is provided in which an automated system is disclosed for handling named objects in VLF and for auto-management of VLF and LLA list/configuration. In one or more embodiments, a machine learning algorithm and data model are utilized to create and manage a knowledgebase system of objects based on execution pattern. Intelligent automation, including the machine learning model and robotic process automation, is utilized to determine object placement and predict swap intervals, as well as to provide predictive placement of objects in memory, based on learning, to optimize enterprise performance. One or more embodiments can provide exploitation of dataspaces beyond 2G, segregation of the VLF area (into pageable, fixed, and temporary areas) to place objects based on derived weightages, and a graphical user interface (e.g., modern interactive interfaces) with actionable insights to align operational goals with technology. The graphical user interface (GUI) can include an application programming interface (API) based and interactive system productivity facility (ISPF) based interface to view, monitor, and control aspects of fetch performance tuning. One or more embodiments can provide efficient staging, by implementing auto-invalidation of changed data objects ensuring availability of objects for rhythmic workload with additional capability to manage deviations/new workloads using temporary VLF with an appropriate warning and control mechanism.

Further, technical effects and benefits include eliminating I/O involved in retrieving named objects as a copy of the object is always available in the VLF data space and reducing the amount of CPU time required to execute the batch and online workloads, thereby reducing the million service units (MSU) usage. One or more embodiments provide highly efficient automated object management using machine learning for all types of workloads, GUI based modern and simplified interfaces to visualize and control the program management, and a display to view and work with named objects managed by VLF.

One or more embodiments described herein can utilize machine learning techniques to perform tasks, such as classifying a feature of interest. More specifically, one or more embodiments described herein can incorporate and utilize rule-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
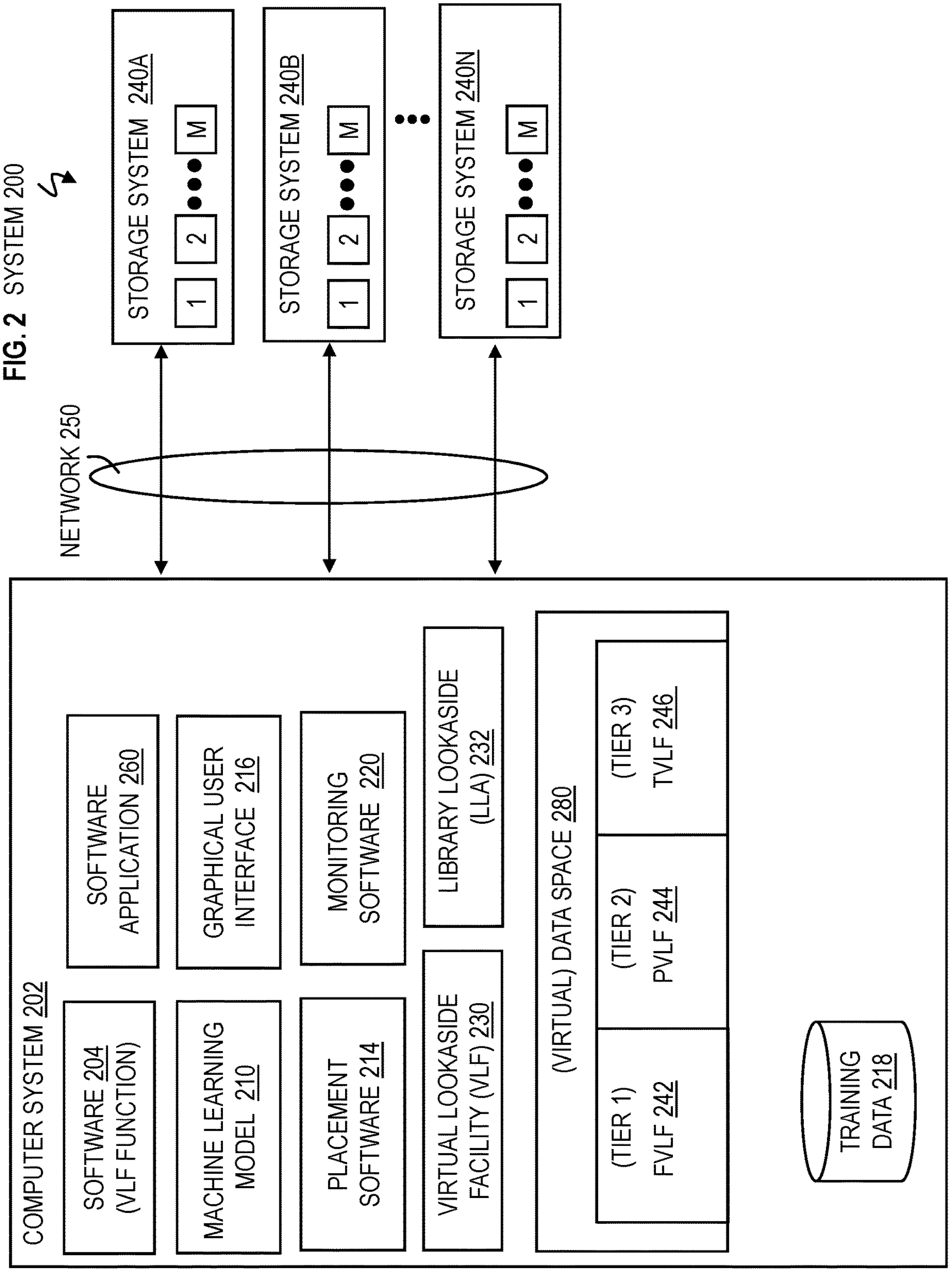
FIG. 2 depicts a block diagram of an example system configured for providing an automatic virtual storage mechanism to optimize fetch performance of named objects in enterprise systems according to one or more embodiments of the present invention.

FIG. 2 depicts a block diagram of an example system 200 configured for providing an automatic virtual storage mechanism to optimize fetch performance of named objects in enterprise systems according to one or more embodiments. The system 200 includes a computer system 202 configured to communicate over a network 250 with many different storage systems 240A, 240B, through 240N. The storage systems 240A-240N can generally be referred to as storage systems 240. Each storage system 240 has its own memory devices. The memory devices 1-M may include hard disk drives, solid state drives, etc. In one or more embodiments, the storage systems 240 can be direct access storage devices (DASDs), in which I/O requests are made to retrieve and store data in the DASDs. The storage systems 240 may be considered secondary storage or auxiliary storage. The storage systems 240 can include controllers, firmware, etc., to operate as understood by one of ordinary skill in the art.

The computer system 202, storage systems 240, software 204, machine learning model 210, automatic placement software 214 (which can include robotic process automation software), graphical user interface 216, etc., can include functionality and features of the computer system 100 in FIG. 1 including various hardware components and various software applications such as software 111 which can be executed as instructions on one or more processors 101 in order to perform actions according to one or more embodiments of the invention. The software 204 can include, be integrated with, call, and work with library lookaside (LLA) facility and virtual lookaside facility (VLF), etc., along with any other virtual functionality. The software 204 can include, be integrated with, instruct, and/or call various other pieces of software, algorithms, application programming interfaces (APIs), etc., to operate as discussed herein. The software 204 may be representative of numerous pieces of software designed to work together. The software 204 may work with other software in a push and pull communication scheme, client-server communication scheme, etc.

The computer system 202 may be representative of numerous computer systems and/or distributed computer systems configured to access the storage systems 240. The computer system 202 as well as the storage systems 240 can be part of a cloud computing environment such as a cloud computing environment 50 depicted in FIG. 7, as discussed further herein. The network 250 can be a wired and/or wireless communication network.

FIG. 3 is a flowchart of a computer-implemented method 300 for providing an automatic virtual storage mechanism to optimize fetch performance of named objects in enterprise systems according to one or more embodiments. The computer-implemented method 300 is executed by the computer system 202. Reference can be made to any figures discussed herein.

Referring to FIG. 3, at blocks 302 and 304 of the computer-implemented method 300, the software 204 of computer system 202 is configured to perform an initial program load (IPL) for the loading the operating system into the computer's main memory (e.g., system memory 103) and to initialize an automatic VLF function. The automatic VLF function may be part of VLF 230. The software 204 can include, be integrated with, and/or call the automatic VLF function. The automatic VLF function creates/initiates a monitoring routine (such as monitoring software 220) as part of its initialization and creates/initiates a management interface such as the graphical user interface (GUI) 216. The monitoring routine works with the LLA 232 and the continuous integration/continuous deployment (CI/CD) pipeline. The monitoring routine of, for example, of the monitoring software 220 monitors managed objects, invalidates objects, updates objects, and maintains objects in the LLA 232. Moreover, in communication with the LLA 232, the monitoring software 220 monitors each time an object is called and records the statistics as part of the fetch data, which will be utilized as training data to update/train the machine learning model 210.

At block 306, the software 204 is configured to determine if software 204 should read in the machine learning model 210 from the previous execution or should update the machine learning model 210 using the most recent fetch data of objects. In one or more embodiments, this decision could be based on input from a system administrator using the management interface of the GUI 216, where the GUI 216 can receive input to use the current version of the machine learning model 210 and/or use an updated version after updating the machine learning model 210. In one or more embodiments, the current version of the machine learning model 210 can be utilized for a predetermined period of time before updating, until a predetermined number of new objects have been added to the storage system 240, and/or until a predetermined number of new objects have been added into a temporary VLF 246 in the virtual data space 280.

At block 320, when (YES) the current version of the machine learning model 210 is to be used, the software 204 is configured to load objects into memory (e.g., virtual data space 280) based on object placement having been determined by the machine learning model 210.

At block 308, when (NO) the current version of the machine learning model 210 is not to be read in, the software 204 is configured to initiate/continue learning for the machine learning model 210. At blocks 310 and 312, the software 204 is configured to identify a new named object and can cause the new named object to be placed in a temporary VLF (TVLF) 246 of the virtual data space 280, in response to determining that the new named object has been added to the storage system 240.

At block 314, as part of the continued learning, the software 204 is configured to build/update the machine learning model 210. This updates or continues training of the machine learning model 210. Based on training data, the machine learning model 210 is configured to determine the optimal virtual memory placement of objects in the virtual data space 280. More particularly, the machine learning model 210 is trained to identify the tier in which to place a given object in the virtual data space 280. The virtual data space 280 includes tier 1 which is identified as fixed VLF (FVLF) 242, tier 2 which is identified as pageable VLF (PVLF) 244, and tier 3 which is identified as temporary VLF 246. The fixed VLF 242 can contain programs assigned the top/highest weightage either by the machine learning model 210 and/or by the system administrator assignment via the GUI 216. In such cases, where there are system constraints, the interface can predict optimal placements to accommodate programs. The objects in the fixed VLF 242 are frequently required or fetched, and these high weightage objects have to be available in the virtual data space 280 for immediate fetch activity. Programs with secondary or tertiary priority can be placed in the pageable VLF 244, and the objects in the pageable VLF 244 have a lower weightage than objects in the fixed VLF 242. The temporary VLF 246 can be used for any new patterns of objects breaching the machine learning model 210, that is, identified by the software 204 prior to the next modelling update. The temporary VLF 246 may come into service when the software 204 discovers a new object from the monitoring routine and/or when the system administrator puts the new object into service. The fetch data of the new object is collected and will be utilized as training data to update the machine learning model 210, where the fetch data includes the statics of object discussed herein. The fixed VLF 242, pageable VLF 244, and the temporary VLF 246 are part of an address space of real memory/storage such as the main memory 103 (of the computer system 202) that is outside of the storage system 240. In one or more embodiments, in addition to being in the main memory 103, the pageable VLF 244 could have one or more portions that are utilizing the storage system 240 when there is not enough storage space in the main memory 103, and the portions can be placed back into the main memory 103 when space is available. Moreover, the placement of objects for the fixed VLF 242 is always in the virtual data space 280 in the main memory 103, while the placement of one or more objects for pageable VLF 244 can transition between the virtual data space 280 in the main memory 103 and auxiliary storage of the storage system 240. Upon memory becoming available in the main memory 103, the software 204 can cause the one or more objects transitionally stored in the storage system 240 for the pageable VLF 244 to be stored back in the virtual data space 280 in the main memory 103. The new objects placed in the temporary VLF 246 remain in the virtual data space 280 in the main memory 103.

In one or more embodiments, the software 204 via the VLF function and/or VLF 230 accesses the fixed VLF 242 of tier 1 first, the pageable VLF 244 of tier 2 second, and the temporary VLF 246 of tier 3 third in order to search and retrieve a stored object. Therefore, objects in tier 1 can be found and returned to the requester faster than objects in tier 2. Accordingly, objects in tier 2 can be found and returned to the requester faster than objects in tier 3. The virtual data space 280 is part of the system memory 103. In one or more embodiments, the virtual storage of the virtual data space 280 can be referred to a combination of real storage (such as, for example, the system memory 103) and auxiliary storage (such as, for example, direct access storage device/disk in the storage system 240), based on the tier that is being utilized.

Training data 218 of objects is utilized to train and update (at block 314) the machine learning model 210. The training data can include data from operating the storage system 240 to fetch (obtain) objects and the virtual data space 280 to fetch objects. As noted herein, the objects can be software programs also referred to as software modules. The training data can be pre-processed into features in feature vectors utilized to train the machine learning model 210. As features, the training data can include statistics such as names/identification of programs/objects fetched for execution at different times of the day, fetch level (e.g., fetched from system memory 103, storage system 240 (e.g., DASD), etc.), fetch time, execution time, number of fetches for a given program/object, etc. The training data regarding one or more new named objects can cause the machine learning model 210 to recommend that one or more new named objects be placed in the virtual data space 280 in a particular one of the tiers, such as the temporary VLF 246. The training data can include statistics of objects already stored in the virtual data space 280, and based on the training data, the machine learning model 210 may determine a different or the same placement of the objects in the virtual data space 280 and/or that one or more objects should be removed from the virtual data space 280. Based on the training data of the statistics of objects stored in the storage system 240, the machine learning model 210 can determine that copies of one or more objects in the storage system 240 should be placed in the virtual data spaces 280. After the training or updating phase, the training results in a trained machine learning model and/or an updated machine learning model.

At block 316, the software 204 is configured to cause the machine learning model 210 to analyze and identify placement locations for objects. This is the inference phase. Based on the fetch data of statistics for the objects, the machine learning model 210 outputs the optimal virtual memory placement for the objects. Further, the machine learning model 210 automatically identifies workload pattern changes from the recorded statistics and determines swap intervals to swap a set or subset of programs/objects in the storage system 240 with another set or subset of programs/objects in the virtual data space 280.

Given the fetch data including statistics associated with a given object, the machine learning model 210 is configured to determine insights based on the what type of object it is (e.g., a new object), the frequency of use for the object (e.g., low frequency or high frequency), the previous weightage assigned, etc. As such, based on the fetch data, the machine learning model 210 is configured to assign the given object to the temporary VLF 246, assign a low weightage to the object that places the object in the pageable VLF 244 based on its usage, and/or assign a high weightage to the object that places the object in the fixed VLF 242 based on its high frequency usage. Additionally, some objects may have a weightage so low, for example, below a predetermined threshold, that the objects are not indicated to be placed in the virtual data space 280, which means that these objects should remain in the storage system 240. In one or more embodiments, the machine learning model 210 can determine that a particular object can placed in the fixed VLF 242 for a first period of time during the day (e.g., 9 AM-5 PM), and then placed in or swapped to the pageable VLF 244 for a second period of time during the day (e.g., 6 PM 10 PM). This improves the efficiency of the fetch operations and the storage system 240.

At blocks 318, the software 204 is configured to cause automatic placement software 214 to place objects in the virtual data space 280 at the predicted locations such as tier 1 for the fixed VLF 242, tier 2 for the pageable VLF 244, and/or tier 3 for the temporary VLF 246. The predicted locations of objects output from the machine learning model 210 are passed to the automatic placement software 214 for execution of the placement. The automatic placement software 214 can include a robotic process automation to copy the objects into the desired tiers of the virtual data space 280, swap objects from one tier to another tier in the virtual data space 280, and/or remove any objects from the virtual data space 280. Robotic process automation (RPA), also known as software robotics, uses automation technologies to mimic back-office tasks of human workers, such as extracting data, filling in forms, moving files, etc. RPA combines APIs and user interface (UI) interactions to integrate and perform repetitive tasks between enterprise and productivity applications. By deploying scripts which emulate human processes, RPA tools complete autonomous execution of various activities and transactions across unrelated software systems.

Figure 4:
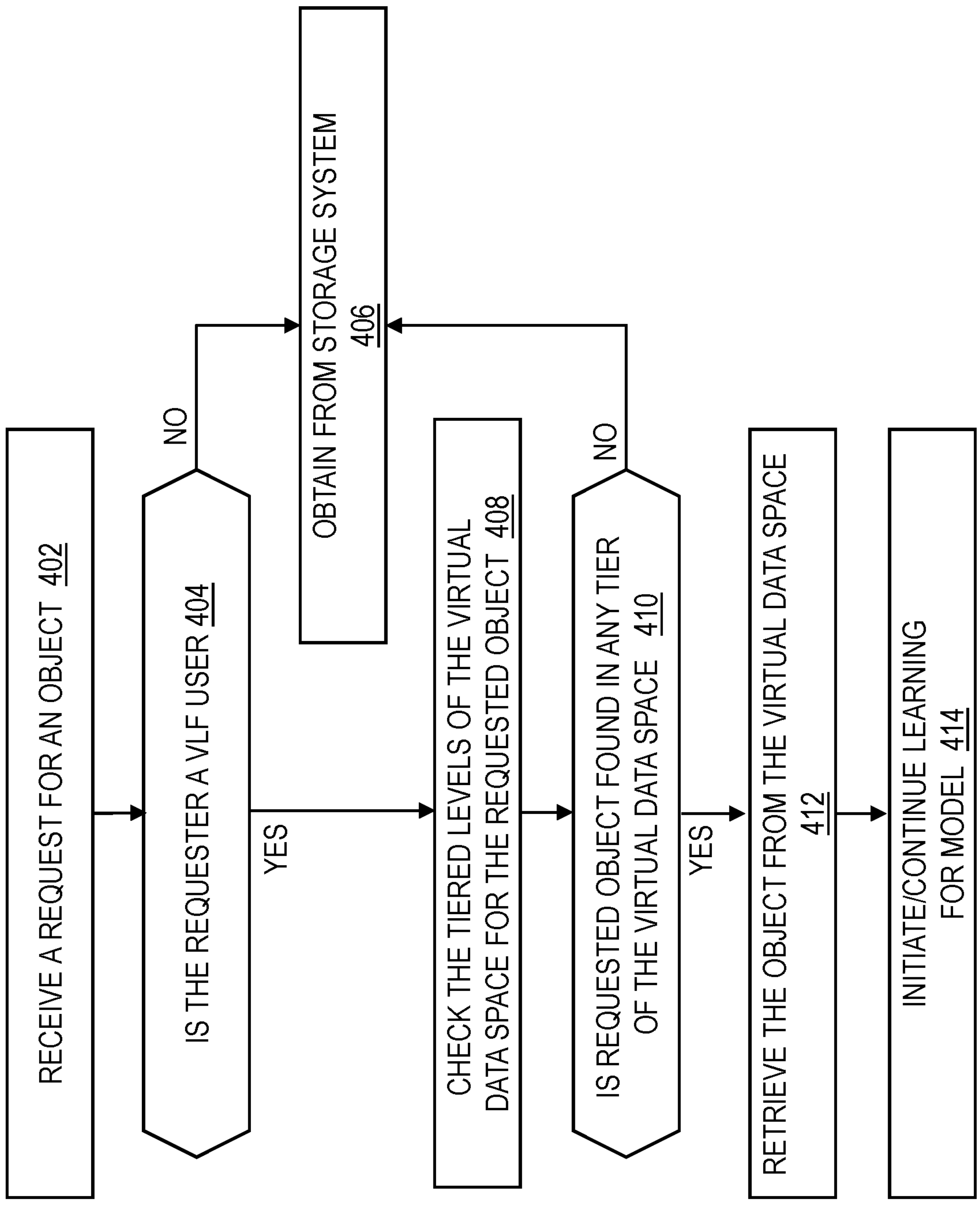
FIG. 4 is a flowchart of a computer-implemented method for providing an automatic virtual storage mechanism to optimize fetch performance of named objects in enterprise systems according to one or more embodiments of the present invention.

FIG. 4 is a flowchart of a computer-implemented method 400 for providing an automatic virtual storage mechanism to optimize fetch performance of named objects in enterprise systems according to one or more embodiments. In an example scenario, a software application 260 is requesting one or more objects such as, for example, one or more software program modules that are to be loaded and run on behalf of the software application 260.

At block 402, the software 204 is configured to receive a request for an object, such as a software program module. At block 404, the software 204 is configured to check if the requester is a VLF user. In the example scenario, the requester is the software application 260. When (NO) the requester is not a VLF user, the software 204 is configured to obtain the requested object from the storage system 240 using an I/O request at block 406.

At block 408, when (YES) the requester is a VLF user, the software 204 is configured to parse the tiers including the fixed VLF 242, the pageable VLF 244, and the temporary VLF 246 of the virtual data space 280 for the requested object. The software 204 may check the LLA 232 for the name/identification of the requested object, and when present, this indicates that the object is in the virtual data space 280 at the identified tier. At block 410, the software 204 is configured to check whether the requested object is found in any of the tiers of the virtual data space 280. If not, flow proceeds to block 406.

At block 412, the software 204 is configured to retrieve the object from the virtual data space 280 without making an I/O request to the storage systems 240. The requested object, for example, a software program module is utilized by the software application 260 to execute a given task. At block 414, the software 204 may initiate/continue learning for the machine learning model 210.

Figure 5:
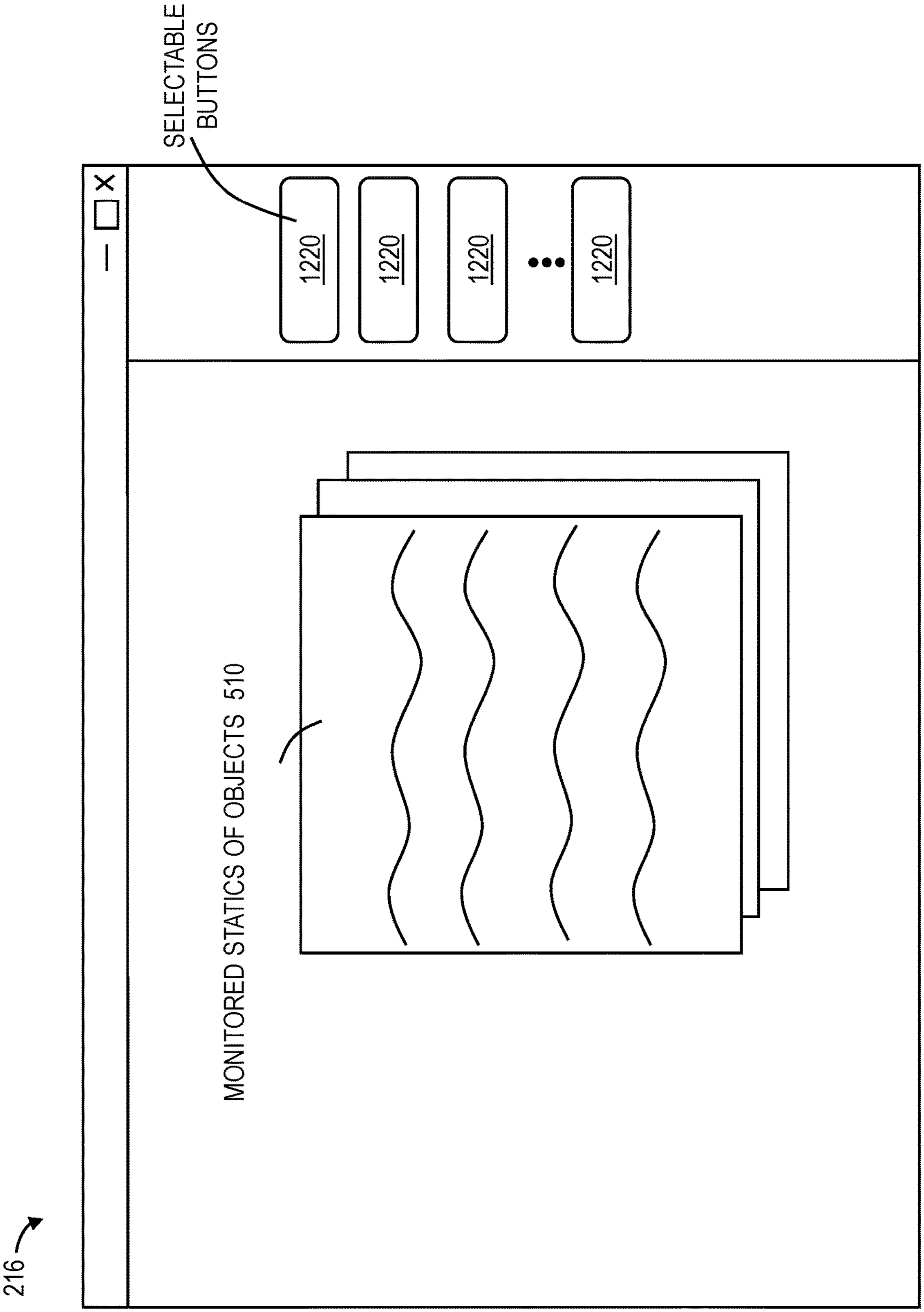
FIG. 5 depicts a block diagram of a graphical user interface for the management interface according to one or more embodiments of the present invention.

FIG. 5 depicts a block diagram of an example of the graphical user interface 216 for the management interface according to one or more embodiments. In conjunction with the software 204, the GUI 216 displays on the display 119 a user friendly interface for the system administrator to view, monitor, and control aspects of fetch performance tuning. The GUI 216 may incorporate an interactive system productivity facility (ISPF) based interface and/or an API based operating system management facility (OSMF) interface. The GUI 216 can include one or more windows 510 for displaying monitored information of objects in the virtual data space 280 and/or objects in the storage systems 240. The GUI 216 can display various selectable buttons 1220 for controlling the aspects of fetch performance tuning. The GUI 216 can display information such as current contents of VLF 230, the virtual data space 280, auto swap model, auto swap factors, hit ratio, miss ratio, and other factors such as weight factors for objects in the tiers of the virtual data space 280, fetch time, execution frequency, number of instances, etc. All of this information is made available to the system administrator for easy analysis and updates/tuning in the GUI 216. Additionally, the GUI 216 provides options to set/change weight factors applied for objects in the virtual data space 280 and to set/change swap cycles of objects from the fixed VLF 242 to the pageable VLF 244 (vice versa) based on a condition or time. The GUI 216 is equipped with options to destroy the current learnings of the machine learning model 210 and cause the machine learning model 210 be updated or continue learning. Using the functionality of one or more of the selectable buttons 1220, the GUI 216 provides a display to increase or decrease the weights to influence the staging and swapping of objects. The weight factors can include, for example, such factors as operational value of the program (e.g., program weights) determined from the number of fetches, fetch frequency, time of the day fetch pattern, user defined overrides, etc.

In one or more embodiments, the GUI 216 is an integrated part of the operating system, initializing the GUI's functions and logic as part of the operating system boot up process. The machine learning model 210 is part of non-volatile memory and is under the control of the system administrator. Using one or more selectable buttons 1220, the GUI 216 provides the system administrator with options to retain the tiered structure of the virtual data space 280 encompassing real storage and auxiliary storage across restarts, or to load the memory objects based on retained learning of the machine learning model 210.

The software 204 can use a combination of real storage and auxiliary storage to achieve optimal fetch performance for modules. The virtual space can be a combination of virtual data spaces 280 (supporting both below and above the 2G bar) and auxiliary storage that is be closely tied together in tiers to guarantee object performance.

FIG. 6 is a flowchart of a computer-implemented method 600 for providing an automatic virtual storage mechanism to optimize fetch performance of named objects in enterprise systems according to one or more embodiments. Reference can be made to any figures discussed herein.

At block 602, the software 204 of computer system 202 is configured to receive from a requester a request to retrieve an object. The requester sending the request could be software application 260. The object could be a software program module stored in the storage system 240A. At block 604, the software 204 of computer system 202 is configured to determine that the object is available for retrieval in a virtual data space 280, where a machine learning model 210 is configured to cause the object to be placed in the virtual data space 280 (in addition to be stored in the (auxiliary/remote) storage system 240A), the machine learning model 210 being trained on fetch data for objects. The fetch data includes statistics (such as names/identification of programs/objects fetched for execution at different times of the day, fetch level (e.g., fetched from memory, DASD, etc.), fetch time, execution time, number of fetches for a given program/object, etc.) for the objects stored in the storage systems 240 and the virtual data space 280 in system memory 103. At block 606, the software 204 of computer system 202 is configured to retrieving the object from the virtual data space 280 of system memory 103 instead of a (remote) storage system 240A. At block 608, the software 204 of computer system 202 is configured to provide the object to the requester for execution. The software application 260 causes the object, for example, the software program module to execute and perform a task on the computer system 202.

Further, the virtual data space 280 includes tiers, for example, the fixed VLF 242, the pageable VLF 244, and the temporary VLF 246. The object is retrieved from a tier in the virtual data space 280.

The machine learning model 210 is retrained based on a trigger, the machine learning model 210 being retrained using the fetch data that has been updated based on recent fetches for the objects. For example, numerous fetches are requested for the objects in the storage systems 240 and the virtual data space 280, and the statistics of the objects are changed/updated for each respect fetch. The trigger may include at least one of a setting in a graphical user interface 216, a predefined time period, a predefined change in the fetch data, and/or a new object being added to the storage system 240.

A library lookaside (LLA 232) is automatically updated based on any new object being added to the virtual data space 280, changed from one tier to another tier in the virtual data space 280, and removed from the virtual data space 280. The software 204 can automatically update the LLA 232 and/or cause VLF 230 to automatically update the LLA 232 to add the name of the new object that is being saved to the virtual data space 280, change an object from being listed in one tier to another tier in the virtual data space 280, and remove an object from the virtual data space 280. The storage system 240 includes auxiliary storage that requires input and output requests to access data.

For input to the machine learning model 210 during training, feature sets are created for the training data of statistics such as names/identification of programs/objects fetched for execution at different times of the day, fetch level (e.g., fetched from memory, DASD, etc.), fetch time, execution time, number of fetches for a given program/object, etc. The feature sets can also include the current placement of objects including the tiers for objects placed in the virtual data space 280. The feature sets include one or more new named objects and their corresponding statistics.

In one or more embodiments, one-hot encoding can be utilized for the feature sets, where values “1” or “0” can be utilized to respectively identify the presence or absence of a particular feature. One-hot encoding is a process of converting categorical data variables so they can be provided to machine learning algorithms, as understood by one of ordinary skill in the art. A feature set is a group of features that can be ingested together and stored in a logical group. Feature sets take data from sources, build a list of features through a set of transformations, and store the resulting features along with the associated metadata and statistics. Features of the feature sets may be included in a matrix or feature matrix. The feature matrix includes the features and their corresponding value or target values. In machine learning, a feature vector is an n-dimensional vector of numerical features that represent some object. Many algorithms in machine learning require a numerical representation of objects since such representations facilitate processing and statistical analysis.

In one or more embodiments, machine learning models discussed herein (including the machine learning model 210) can include various engines/classifiers and/or can be implemented on a neural network. The features of the engines/classifiers can be implemented by configuring and arranging the computer system 202 to execute machine learning algorithms. In general, machine learning algorithms, in effect, extract features from received data (e.g., the complete message formed of segmented messages) in order to “classify” the received data. Examples of suitable classifiers include but are not limited to neural networks, support vector machines (SVMs), logistic regression, decision trees, hidden Markov Models (HMMs), etc. The end result of the classifier’s operations, i.e., the “classification,” is to predict a class (or label) for the data. The machine learning algorithms apply machine learning techniques to the received data in order to, over time, create/train/update a unique “model.” The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines/classifiers are implemented as neural networks (or artificial neural networks), which use a connection (synapse) between a pre-neuron and a post-neuron, thus representing the connection weight. Neuromorphic systems are interconnected elements that act as simulated “neurons” and exchange “messages” between each other. Similar to the so-called “plasticity” of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network’s designer, the activations of these input neurons are then passed to other downstream neurons, which are often referred to as “hidden” neurons. This process is repeated until an output neuron is activated. Thus, the activated output neuron determines (or “learns”) and provides an output or inference regarding the input.

Training datasets (e.g., training data 218) can be utilized to train the machine learning algorithms. The training datasets can include historical data (including statistics) of past fetches of objects and the corresponding weights to be applied to features of the historical data. Labels can be applied to features of objects to train the machine learning algorithms, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
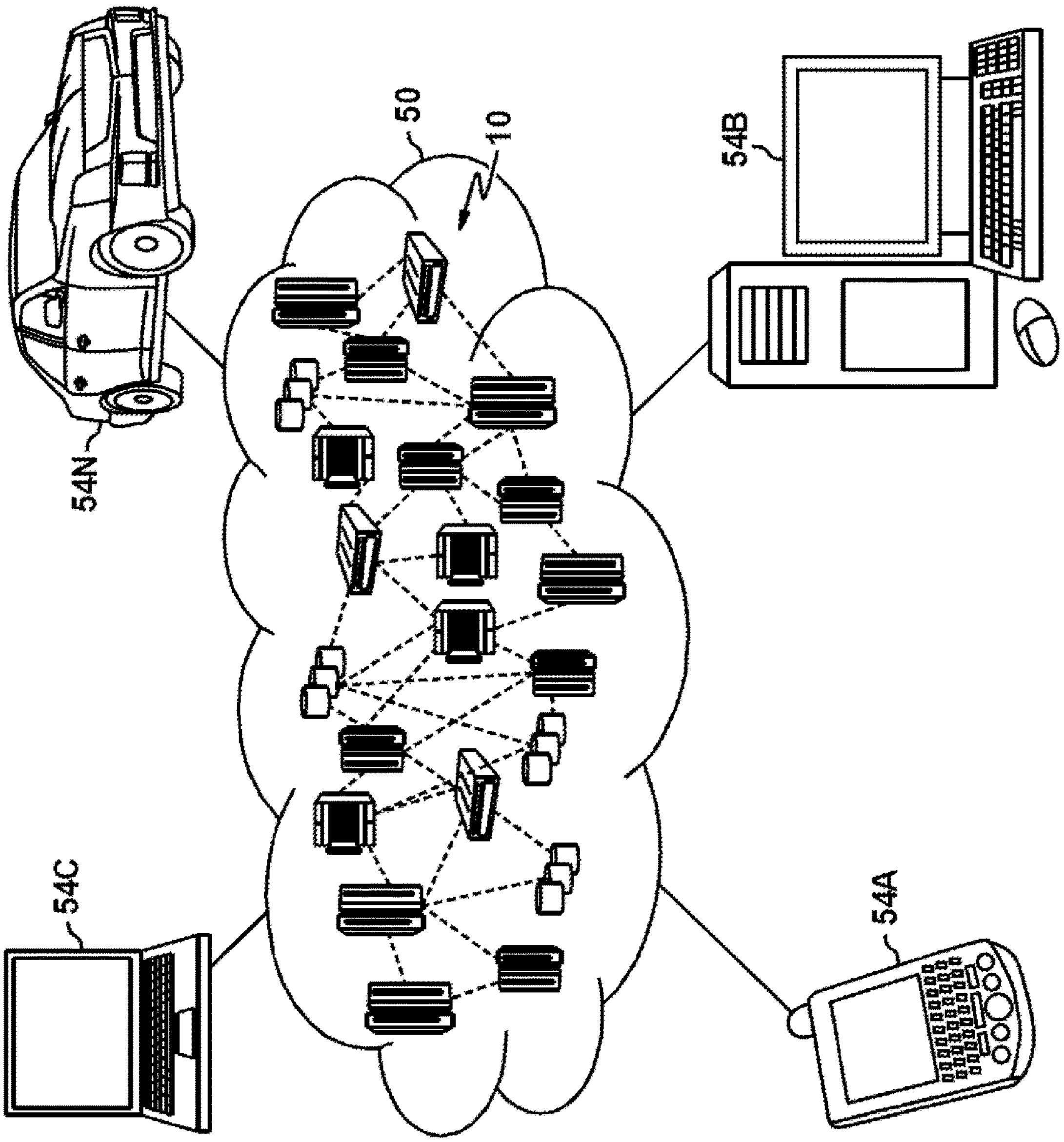
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
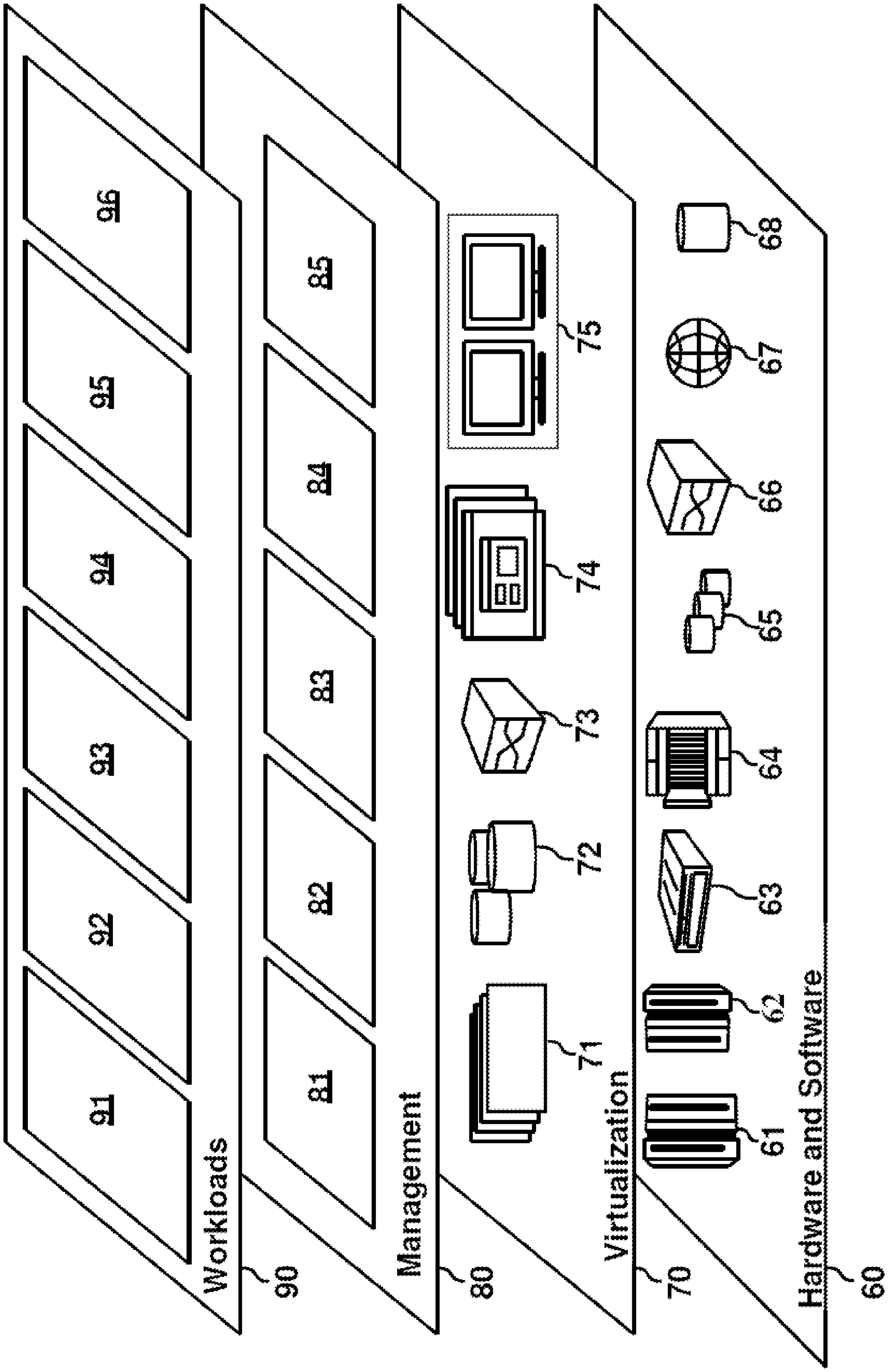
FIG. 8 depicts abstraction model layers according to one or more embodiments of the present invention.

Referring now to FIG. 8, a set of functional abstraction layers provided by cloud computing environment 50 (depicted in FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

predicting by a machine learning model a location for placing an object, wherein the location predicted is a virtual data space of a local memory, the virtual data space comprising tiers, wherein the tiers comprise a fixed virtual lookaside facility (VLF) having a highest weightage for storing first objects assigned by the machine learning model, a pageable VLF having a lower weightage than the highest weightage for storing second objects, and a temporary VLF for storing third objects incoming to the machine learning model prior to a retraining of the machine learning model, wherein the retraining of the machine learning model is based at least in part on the third objects received prior to the retraining in order to swap one or more objects within the tiers of the virtual data space;

receiving from a requester a request to retrieve the object;

determining that the object is available for retrieval in the virtual data space of the local memory, wherein the machine learning model is configured to cause the object to be placed in the virtual data space, the machine learning model being trained on fetch data for objects;

retrieving the object from the virtual data space of the local memory instead of a storage system that is remote from the local memory, wherein the machine learning model is retrained based on a trigger; and providing the object to the requester for execution from the local memory instead of the storage system, in response to the machine learning model predicting the location for the object as the virtual data space of the local memory.

2. The computer-implemented method of claim 1, wherein the first objects in the fixed VLF are searchable and retrievable faster than the second objects in the pageable VLF; and wherein the second objects in the pageable VLF are searchable and retrievable faster than the third objects in the temporary VLF.

3. The computer-implemented method of claim 1, wherein the object is retrieved from one of the tiers in the virtual data space; and wherein the machine learning model is trained to identify one of a first, second, and third tiers in which to place new objects.

4. The computer-implemented method of claim 1, wherein the trigger comprises a setting in a graphical user interface having selectable buttons for controlling fetch performance tuning, wherein training data comprises historical data including a type of the objects, names of the objects, a fetch time of the objects, an execution time of the objects, and a number of fetches of the objects, wherein training the machine learning model comprises associating labels with the historical data in order to modify weights in the machine learning model such that a placement of one or more of the objects is modified within the tiers of the virtual data space;

wherein the graphical user interface comprises options for changing weight factors applied to the objects in the tiers of the virtual data space; and wherein the fetch performance tuning provides the options for increasing or decreasing weights to modify staging and swapping of the objects for the placement in the tiers of the virtual data space.

5. The computer-implemented method of claim 1, wherein the trigger further comprises at least one of a predefined time period or a predefined change in the fetch data.

6. The computer-implemented method of claim 1, wherein a library lookaside is automatically updated based on any new object being added to the virtual data space, changed from one tier to another tier in the virtual data space, and removed from the virtual data space.

7. The computer-implemented method of claim 1, wherein the storage system comprises auxiliary storage that requires input and output requests to access data; and wherein the machine learning model is trained to determine to store a given object in the fixed VLF for a first period of a day and swap the given object to the pageable VLF for a second period of time during the day.

8. A system comprising:

a memory having computer readable instructions; and one or more processors for executing the computer readable instructions, the computer readable instructions controlling the one or more processors to perform operations comprising:

predicting by a machine learning model a location for placing an object, wherein the location predicted is a virtual data space of a local memory, the virtual data space comprising tiers, wherein the tiers comprise a fixed virtual lookaside facility (VLF) having a highest weightage for storing first objects assigned by the machine learning model, a pageable VLF having a lower weightage than the highest weightage for storing second objects, and a temporary VLF for storing third objects incoming to the machine learning model prior to a retraining of the machine learning model, wherein the retraining of the machine learning model is based at least in part on the third objects received prior to the retraining in order to swap one or more objects within the tiers of the virtual data space;

receiving from a requester a request to retrieve the object;

determining that the object is available for retrieval in the virtual data space of the local memory, wherein the machine learning model is configured to cause the object to be placed in the virtual data space, the machine learning model being trained on fetch data for objects;

retrieving the object from the virtual data space of the local memory instead of a storage system that is remote from the local memory, wherein the machine learning model is retrained based on a trigger; and providing the object to the requester for execution from the local memory instead of the storage system, in response to the machine learning model predicting the location for the object as the virtual data space of the local memory.

9. The system of claim 8, wherein the first objects in the fixed VLF are searchable and retrievable faster than the second objects in the pageable VLF; and wherein the second objects in the pageable VLF are searchable and retrievable faster than the third objects in the temporary VLF.

10. The system of claim 8, wherein the object is retrieved from one of the tiers in the virtual data space; and wherein the machine learning model is trained to identify one of a first, second, and third tiers in which to place new objects.

11. The system of claim 8, wherein the machine learning model is trained using the fetch data that has been updated based on recent fetches for the objects.

12. The system of claim 11, wherein the trigger further comprises at least one of a predefined time period or a predefined change in the fetch data.

13. The system of claim 8, wherein a library lookaside is automatically updated based on any new object being added to the virtual data space, changed from one tier to another tier in the virtual data space, and removed from the virtual data space.

14. The system of claim 8, wherein the storage system comprises auxiliary storage that requires input and output requests to access data.

15. A computer program product comprising a computer readable storage medium having program instructions embodied therewith, the program instructions executable by one or more processors to cause the one or more processors to perform operations comprising:

predicting by a machine learning model a location for placing an object, wherein the location predicted is a virtual data space of a local memory, the virtual data space comprising tiers, wherein the tiers comprise a fixed virtual lookaside facility (VLF) having a highest weightage for storing first objects assigned by the machine learning model, a pageable VLF having a lower weightage than the highest weightage for storing second objects, and a temporary VLF for storing third objects incoming to the machine learning model prior to a retraining of the machine learning model, wherein the retraining of the machine learning model is based at least in part on the third objects received prior to the retraining in order to swap one or more objects within the tiers of the virtual data space;

receiving from a requester a request to retrieve the object;

determining that the object is available for retrieval in the virtual data space of the local memory, wherein the machine learning model is configured to cause the object to be placed in the virtual data space, the machine learning model being trained on fetch data for objects;

retrieving the object from the virtual data space of the local memory instead of a storage system that is remote from the local memory, wherein the machine learning model is retrained based on a trigger; and providing the object to the requester for execution from the local memory instead of the storage system, in response to the machine learning model predicting the location for the object as the virtual data space of the local memory.

16. The computer program product of claim 15, wherein the first objects in the fixed VLF are searchable and retrievable faster than the second objects in the pageable VLF; and wherein the second objects in the pageable VLF are searchable and retrievable faster than the third objects in the temporary VLF.

17. The computer program product of claim 15, wherein the object is retrieved from one of the tiers in the virtual data space; and wherein the machine learning model is trained to identify one of a first, second, and third tiers in which to place new objects.

18. The computer program product of claim 15, wherein the machine learning model is trained using the fetch data that has been updated based on recent fetches for the objects.

19. The computer program product of claim 18, wherein the trigger comprises at least one of a predefined time period or a predefined change in the fetch data.

20. The computer program product of claim 15, wherein a library lookaside is automatically updated based on any new object being added to the virtual data space, changed from one tier to another tier in the virtual data space, and removed from the virtual data space.

* * * * *